(12) United States Patent
Huang (10) Patent No.: US 11,013,317 B2
(45) Date of Patent: May 25, 2021

(54) FOLDING STAND FOR ELECTRONIC DEVICE

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 21 days.

(21) Appl. No.: 16/553,321

(22) Filed: Aug. 28, 2019

(65) Prior Publication Data

US 2021/0059402 A1    Mar. 4, 2021

(51) Int. Cl.
*A47B 23/04* (2006.01)
*F16M 11/20* (2006.01)
*F16M 13/00* (2006.01)
*A47B 23/00* (2006.01)

(52) U.S. Cl.
CPC .......... *A47B 23/043* (2013.01); *A47B 23/042* (2013.01); *F16M 11/2021* (2013.01); *A47B 23/001* (2013.01); *A47B 23/04* (2013.01); *A47B 2023/049* (2013.01); *F16M 13/00* (2013.01)

(58) Field of Classification Search
CPC ............... A47B 23/042; A47B 23/043; A47B 2023/049; F16M 11/10; F16M 13/00; F16M 11/2021
See application file for complete search history.

(56) References Cited

U.S. PATENT DOCUMENTS

| | | | | |
|---|---|---|---|---|
| 2,489,553 A | * | 11/1949 | Wofford | A47B 23/043 190/1 |
| 3,411,741 A | * | 11/1968 | Nadler | A47B 23/044 248/456 |
| 4,313,589 A | * | 2/1982 | Vega | A47B 23/04 248/444.1 |
| 4,555,128 A | * | 11/1985 | White | A47B 23/043 281/45 |
| 4,852,498 A | * | 8/1989 | Judd | A47B 23/043 108/43 |
| 4,863,124 A | * | 9/1989 | Ball | A47B 21/00 108/28 |
| 4,907,777 A | * | 3/1990 | Stewart | A47B 23/04 248/444.1 |
| 4,948,139 A | * | 8/1990 | Heeszel | A45C 9/00 190/10 |
| 5,029,798 A | * | 7/1991 | Clark | A47B 23/044 248/459 |
| 5,068,987 A | * | 12/1991 | Tontarelli | A47G 1/143 40/753 |

(Continued)

*Primary Examiner* — Jonathan Liu
*Assistant Examiner* — Taylor L Morris
(74) *Attorney, Agent, or Firm* — Demian K. Jackson; Jackson IPG PLLC (57) ABSTRACT

A folding stand is provided with a rectangular base (1) including two parallel sets of top slots (11), two bottom cavities (12), and aside hole (15); a rectangular panel (2) hingedly secured to a front end of a top of the base (1) and including two sets of two parallel grooves (21), two spacers (22) moveably disposed in the grooves (21) of different sets or in the side hole (15), and a front, pivotal ledge (23); a support arm (3) having two ends pivotably secured to a bottom of the panel (2) and selectively disposed in the slots (11) of different sets; two aligned extension arms (4) each having one end pivotably secured to one of two rear corners of the base (1), the extension arm (4) including a lengthwise trough (41); and two legs (5) pivotably disposed in the cavities (12) respectively.

1 Claim, 8 Drawing Sheets

(56) References Cited

U.S. PATENT DOCUMENTS

| | | | | |
|---|---|---|---|---|
| 5,470,041 A * | 11/1995 | Cucinotta | A47B 23/042 | 248/346.03 |
| 5,649,683 A * | 7/1997 | Ahn | A47B 23/042 | 248/453 |
| 5,651,525 A * | 7/1997 | Yang | A47B 23/043 | 248/456 |
| 5,692,815 A * | 12/1997 | Murphy | G06F 3/0395 | 312/283 |
| D390,718 S * | 2/1998 | Howland | D6/406.6 | |
| 5,797,578 A * | 8/1998 | Graffeo | A47B 23/043 | 248/453 |
| 5,855,329 A * | 1/1999 | Pagano | A47B 23/042 | 248/444.1 |
| 5,855,351 A * | 1/1999 | Cziraky | A47B 97/04 | 248/451 |
| 6,152,417 A * | 11/2000 | Randall | A47B 23/001 | 108/43 |
| 6,208,508 B1 * | 3/2001 | Ruch | G06F 1/1632 | 361/679.41 |
| 6,256,193 B1 * | 7/2001 | Janik | A47B 23/043 | 248/922 |
| 6,971,621 B2 * | 12/2005 | Gaines | A47B 23/043 | 248/447 |
| 6,971,622 B2 * | 12/2005 | Ziegler | F16M 11/10 | 248/454 |
| 7,172,167 B2 * | 2/2007 | Phifer | A47B 23/042 | 108/11 |
| 7,543,704 B2 * | 6/2009 | Miller | B25H 1/04 | 190/11 |
| 7,545,637 B2 * | 6/2009 | Liu | G06F 1/203 | 361/679.56 |
| 7,758,009 B1 * | 7/2010 | Chang | A47B 23/044 | 248/460 |
| 7,770,864 B2 * | 8/2010 | Phifer | A47B 23/043 | 248/455 |
| D624,922 S * | 10/2010 | Hui | D14/447 | |
| 7,911,784 B2 * | 3/2011 | Jones | G06F 1/1632 | 361/679.55 |
| 7,926,429 B2 * | 4/2011 | Wu | G06F 1/1632 | 108/43 |
| 7,959,124 B2 * | 6/2011 | Phifer | A47B 23/042 | 248/451 |
| 8,123,189 B2 * | 2/2012 | Phifer | A47B 23/044 | 248/460 |
| 8,205,561 B1 * | 6/2012 | Bierworth | A47C 7/705 | 108/9 |
| 8,322,290 B1 * | 12/2012 | Mignano | A47B 23/043 | 108/9 |
| 8,424,464 B2 * | 4/2013 | Korpi | A47B 23/044 | 108/9 |
| 8,453,981 B2 * | 6/2013 | Suckle | F16M 11/22 | 248/127 |
| 8,459,453 B2 * | 6/2013 | Parker | F16M 13/00 | 206/320 |
| 8,534,619 B2 * | 9/2013 | Huang | F16M 13/00 | 248/166 |
| 8,840,334 B2 * | 9/2014 | Huang | H04M 1/0237 | 403/329 |
| 8,851,439 B2 * | 10/2014 | Phifer | A47B 23/044 | 248/460 |
| 8,902,587 B2 * | 12/2014 | Yu | G06F 3/0208 | 361/679.59 |
| 8,991,319 B2 * | 3/2015 | Korpi | B64D 11/0638 | 108/44 |
| 9,089,203 B1 * | 7/2015 | Al-Raqadi | A47B 17/033 | |
| 9,220,327 B2 * | 12/2015 | Hsu | H04B 1/3877 | |
| 9,234,622 B2 * | 1/2016 | Hsu | A47B 23/02 | |
| 9,635,929 B1 * | 5/2017 | Wu | A47B 3/02 | |
| 9,637,063 B1 * | 5/2017 | Shawver | G06F 1/1632 | |
| 9,999,296 B1 * | 6/2018 | Fan | F16M 11/38 | |
| 2003/0079661 A1 * | 5/2003 | Luu | A47B 3/08 | 108/116 |
| 2004/0007649 A1 * | 1/2004 | Vettraino | F16M 13/00 | 248/127 |
| 2004/0256535 A1 * | 12/2004 | Desch | A47B 23/042 | 248/460 |
| 2006/0027146 A1 * | 2/2006 | Lee | A47B 19/00 | 108/6 |
| 2006/0108494 A1 * | 5/2006 | Lancet | A47B 23/043 | 248/456 |
| 2008/0011915 A1 * | 1/2008 | Landman | A47B 19/00 | 248/150 |
| 2008/0023283 A1 * | 1/2008 | Sutker | A45C 9/00 | 190/100 |
| 2009/0114790 A1 * | 5/2009 | Fan | F16M 11/38 | 248/346.5 |
| 2009/0314913 A1 * | 12/2009 | Gillis | A47B 23/042 | 248/346.01 |
| 2010/0155346 A1 * | 6/2010 | Cheng | A47B 43/00 | 211/13.1 |
| 2010/0237217 A1 * | 9/2010 | Sao | F16M 11/38 | 248/425 |
| 2010/0294909 A1 * | 11/2010 | Hauser | B42D 9/00 | 248/456 |
| 2011/0056412 A1 * | 3/2011 | Grammer | A45C 9/00 | 108/6 |
| 2011/0180682 A1 * | 7/2011 | Tarnutzer | G06F 1/1616 | 248/447 |
| 2012/0186499 A1 * | 7/2012 | Chen | A47B 23/043 | 108/50.13 |
| 2015/0359328 A1 * | 12/2015 | van Hooft | F16B 1/00 | 248/456 |
| 2016/0015141 A1 * | 1/2016 | Feinberg | A47B 23/043 | 206/45.24 |
| 2016/0374463 A1 * | 12/2016 | Wu | A47B 97/00 | 108/25 |
| 2017/0025036 A1 * | 1/2017 | Strieby | G06F 1/1632 | |
| 2017/0318958 A1 * | 11/2017 | Asante | F16M 11/28 | |
| 2018/0192770 A1 * | 7/2018 | Lu | G06F 1/203 | |
| 2018/0299923 A1 * | 10/2018 | Kuo | F16M 11/38 | |
| 2019/0166987 A1 * | 6/2019 | Diaz | A47B 23/043 | |

* cited by examiner

FOLDING STAND FOR ELECTRONIC DEVICE

BACKGROUND OF THE INVENTION

1. Field of the Invention

The invention relates to stands and more particularly to a folding stand for one or more electronic devices including a notebook computer, mobile phone(s), a keyboard, and a tablet computer.

2. Description of Related Art

Mobile electronic devices (e.g., tablet computers and smart phones) are used by people in daily lives. For watching video more comfortably, a stand is provided on a bottom of an electronic device as support.

A user may need to move the stand with the hands. When the user needs to place the electronic device on the table, the user may use one hand to hold the body of the electronic device, and the other hand to moves the stand in order to change position. However, it is inconvenient in use because the stand is not foldable.

Thus, the need for improvement still exists.

SUMMARY OF THE INVENTION

It is therefore one object of the invention to provide a folding stand comprising a rectangular base including two parallel sets of a plurality of slots on a top surface, two cavities adjacent to two sides of a bottom respectively, two side wells each disposed in the cavity, and a side hole; a rectangular panel hingedly secured to a front end of the top surface of the base and including two sets of two parallel grooves, two spacers configured to moveably dispose in the grooves of different sets in a ready to use position or in the side hole in a non-use position, and a pivotal ledge at a front end; a support arm having two ends pivotably secured to a bottom surface of the panel and configured to selectively dispose in the slots of different sets for adjusting an inclined angle of the panel with respect to the base; two aligned extension arms each having one end pivotably secured to one of two rear corners of the base, the extension arm including a lengthwise trough; and two legs each including a main part, a second part inclined at an acute angle with respect to the main part, a hinge tube at an end of the second part, and a pivot pin driven through the base and the hinge tube to pivotably fasten the hinge tube in the well; wherein in a first position, the legs are disposed in the cavities respectively; and wherein in a second position, the leg are extended by pivoting about the wells.

The above and other objects, features and advantages of the invention will become apparent from the following detailed description taken with the accompanying drawings.

DETAILED DESCRIPTION OF THE INVENTION

Referring to FIGS. 1 to 6, a folding stand in accordance with the invention comprises a base 1, a panel 2, a support arm 3, two extension arms 4, and two opposite legs 5 under the base 1 as discussed in detail below.

The rectangular base 1 includes two parallel sets of a plurality of slots 11 on a top surface, two cavities 12 adjacent to two sides of a bottom respectively, two side wells 13 each in the cavity 12, two pivots 14 at two rear corners respectively, and a side hole 15 adjacent to one of the pivots 14.

The rectangular panel 2 is hingedly secured to a front end of the top surface of the base 1 and includes two sets of two parallel grooves 21, two spacers 22 configured to moveably dispose in the grooves 21 of different sets in a ready to use position or dispose in the side hole 15 in a non-use position, and a pivotal ledge 23 at a central portion of a front end.

The support arm 3 has two ends pivotably secured to a central portion of a bottom surface of the panel 2 and is configured to selectively dispose in the slots 11 of different sets for adjusting an inclined angle of the panel 2 with respect to the base 1.

The extension arms 4 are aligned and each extension arm 4 has one end pivotably secured to the pivot 14. The extension arm 4 includes a lengthwise trough 41. In a non-use position, the other ends of the extension arms 4 are adjacent to each other.

In a non-use position, the legs 5 are disposed in the cavities 12 respectively. The leg 5 includes a main part 52, a second part 51 inclined at an acute angle with respect to the main part 52, a recess 53 between the main part 52 and the second part 51, a hinge tube 54 at an end of the second part 51, a channel 55 through the hinge tube 54, and a pivot pin 56 driven through the base 1 and the channel 55 to pivotably fasten the hinge tube 54 in the well 13. Thus, the leg 5 may be fully extended by pivoting about the well 13 in a use position.

Figure 1:
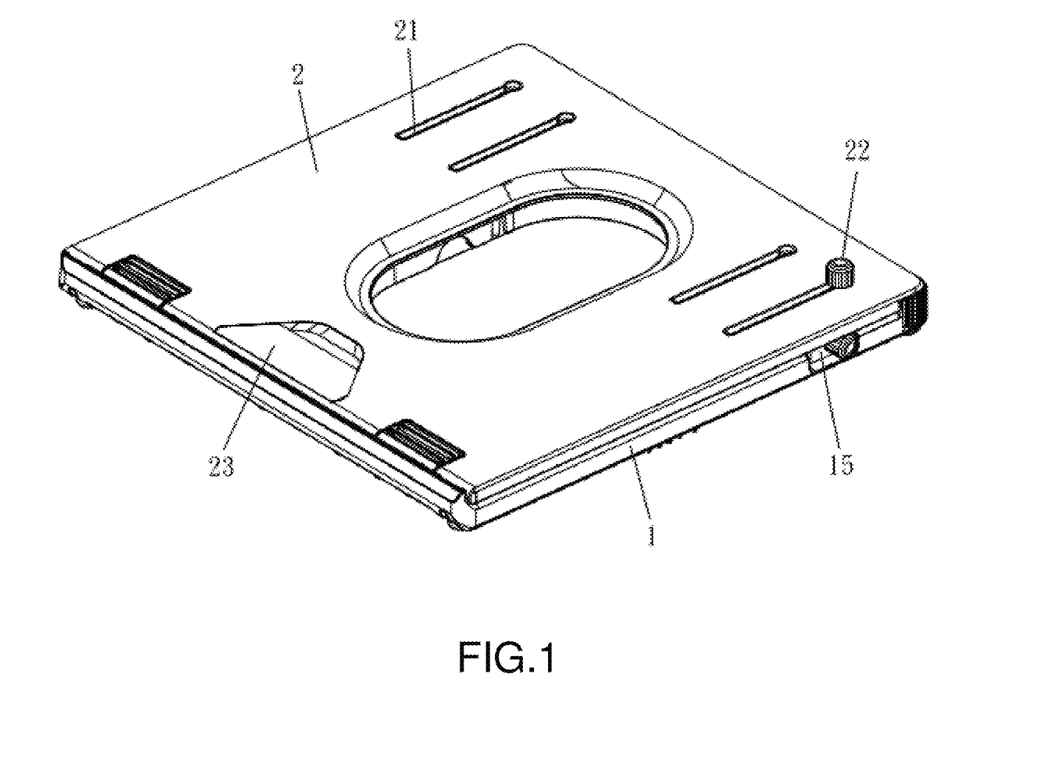
FIG. 1 is a perspective view of a folding stand according to the invention, legs of the folding stand being collapsed.
Figure 2:
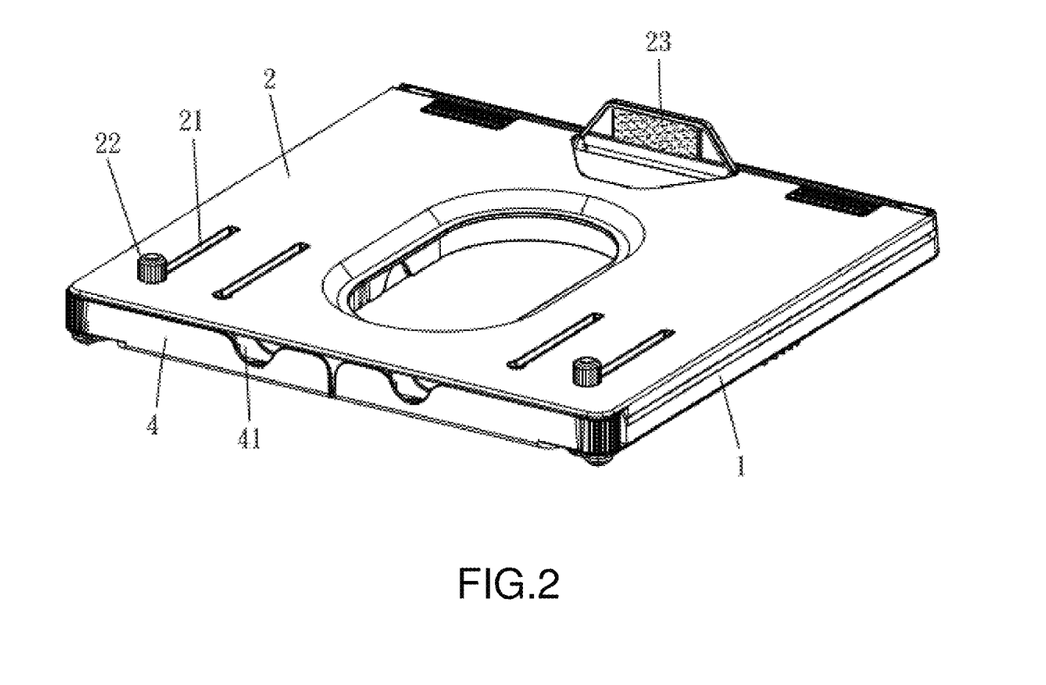
FIG. 2 is another perspective view of the folding stand.
Figure 3:
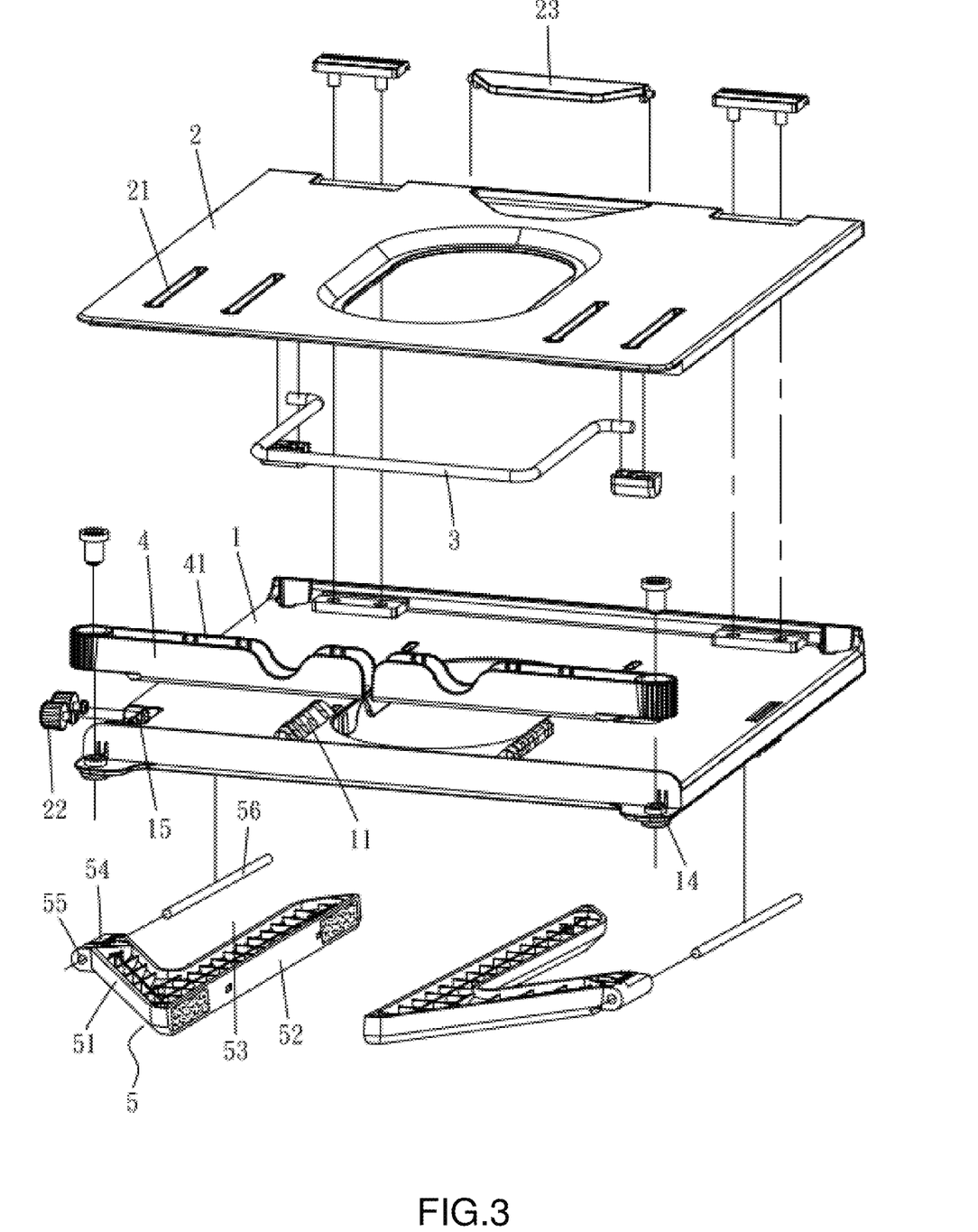
FIG. 3 is an exploded view of the folding stand.
Figure 4:
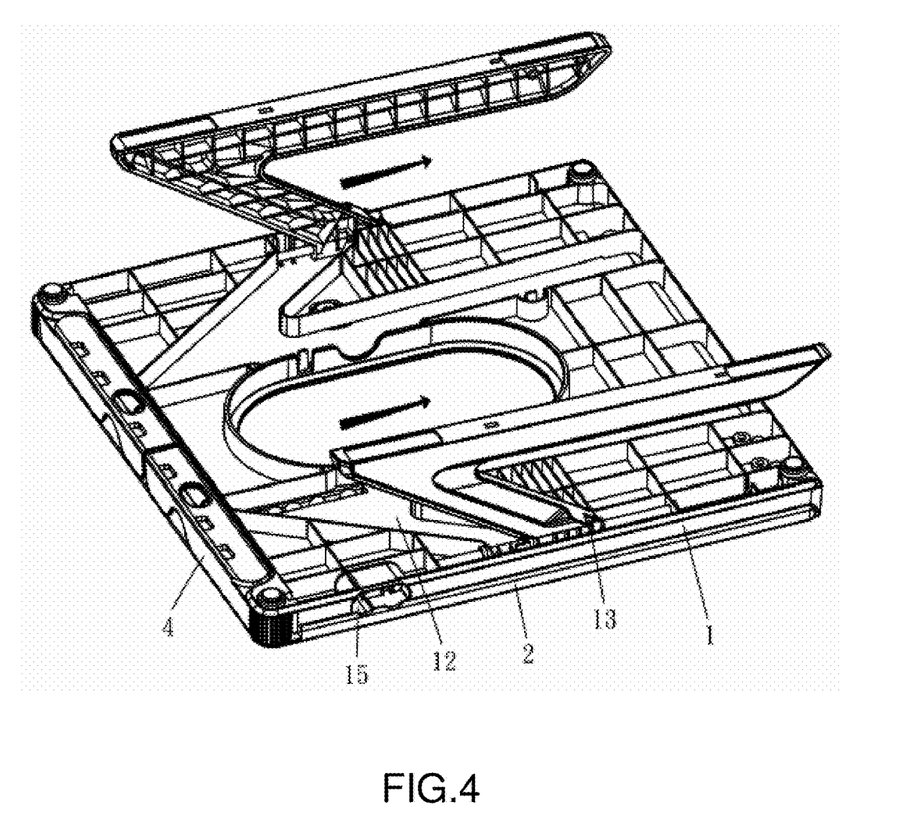
FIG. 4 is a perspective view of the folding stand viewed from a bottom, with the legs being fully extended.
Figure 5:
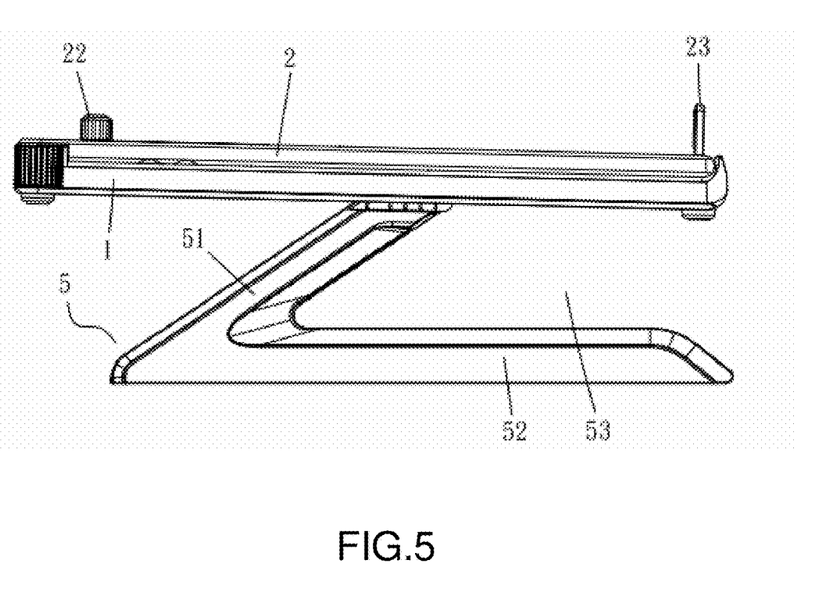
FIG. 5 is a side elevation of FIG. 4.
Figure 6:
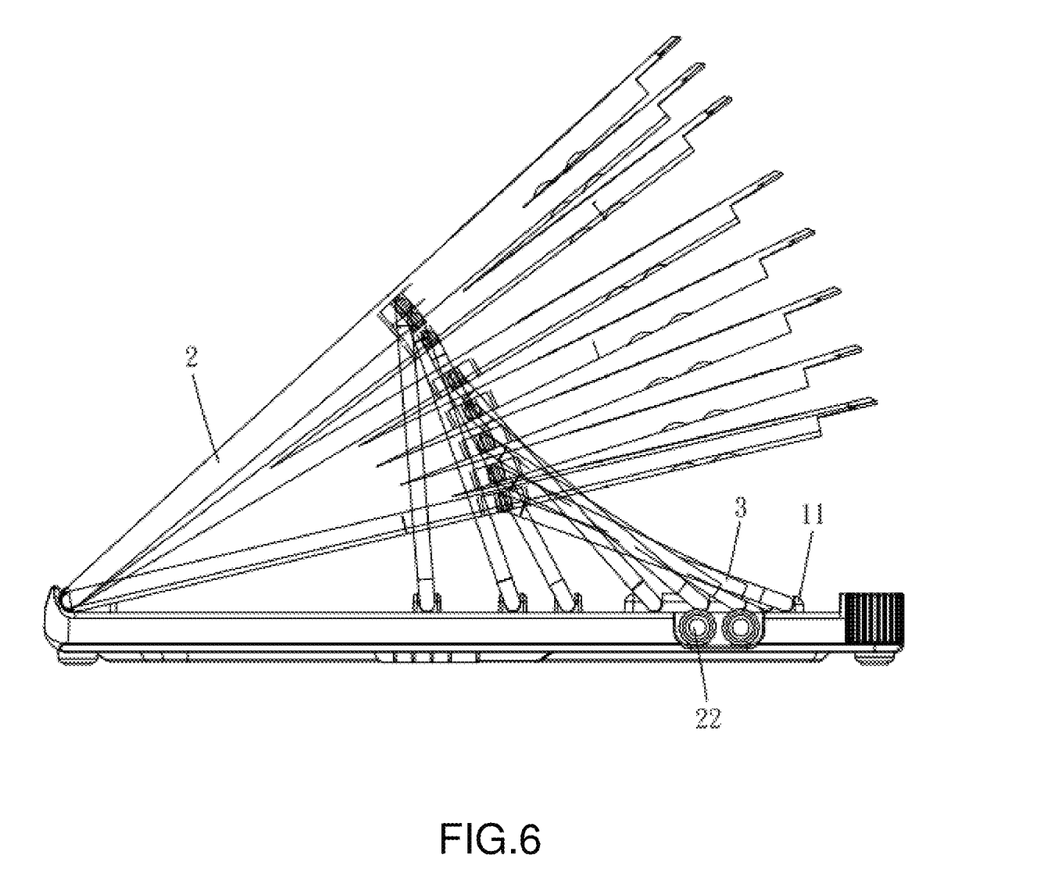
FIG. 6 is a side elevation of the folding stand with the legs being folded and the panel being gradually counterclockwise rotated to dispose in an inclined position.
Figure 7:
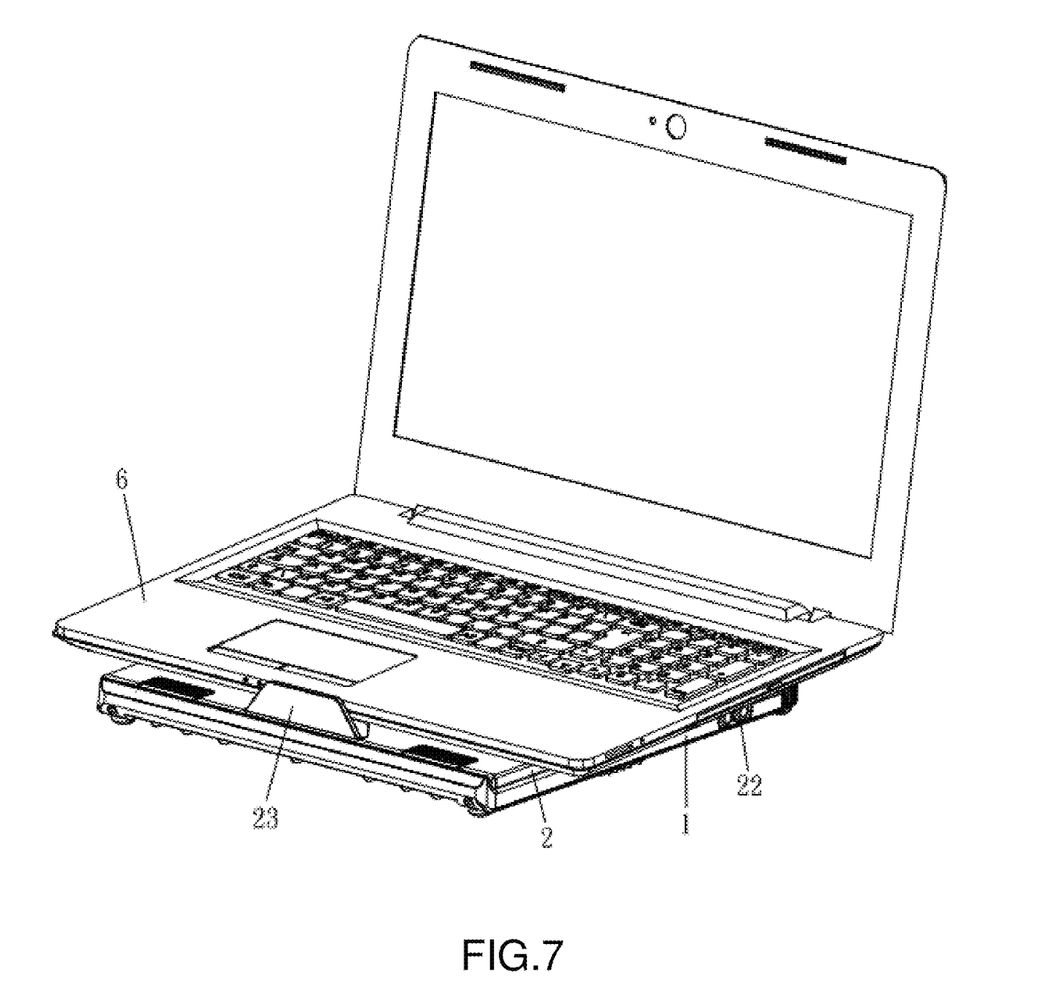
FIG. 7 is a perspective of the folding stand with a notebook computer being open and placed on the horizontally disposed panel.

Referring to FIG. 7, a notebook computer 6 is open and placed on the horizontally disposed panel 2. The ledge 23 is pivoted to serve a limit member to prevent the notebook computer 6 from being moved out of the panel 2.

Figure 8:
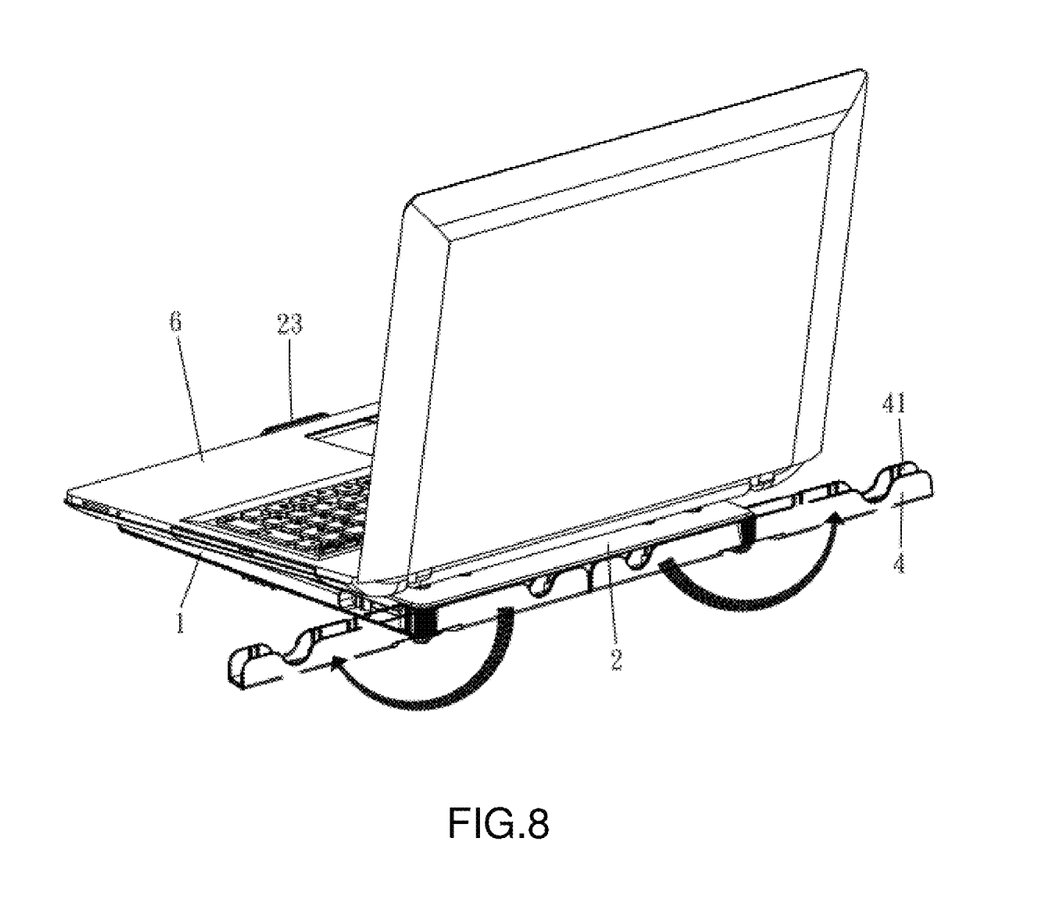
FIG. 8 is a view similar to FIG. 7 with the panel being slightly inclined and the extension arms being pivoted 180-degree to be ready for use.

Referring to FIG. 8, the panel 2 is slightly inclined so that an individual may have a good angle of viewing the monitor of the notebook computer 6. Further, the extension arms 4 are pivoted 180-degree as indicated by arrows.

Figure 9:
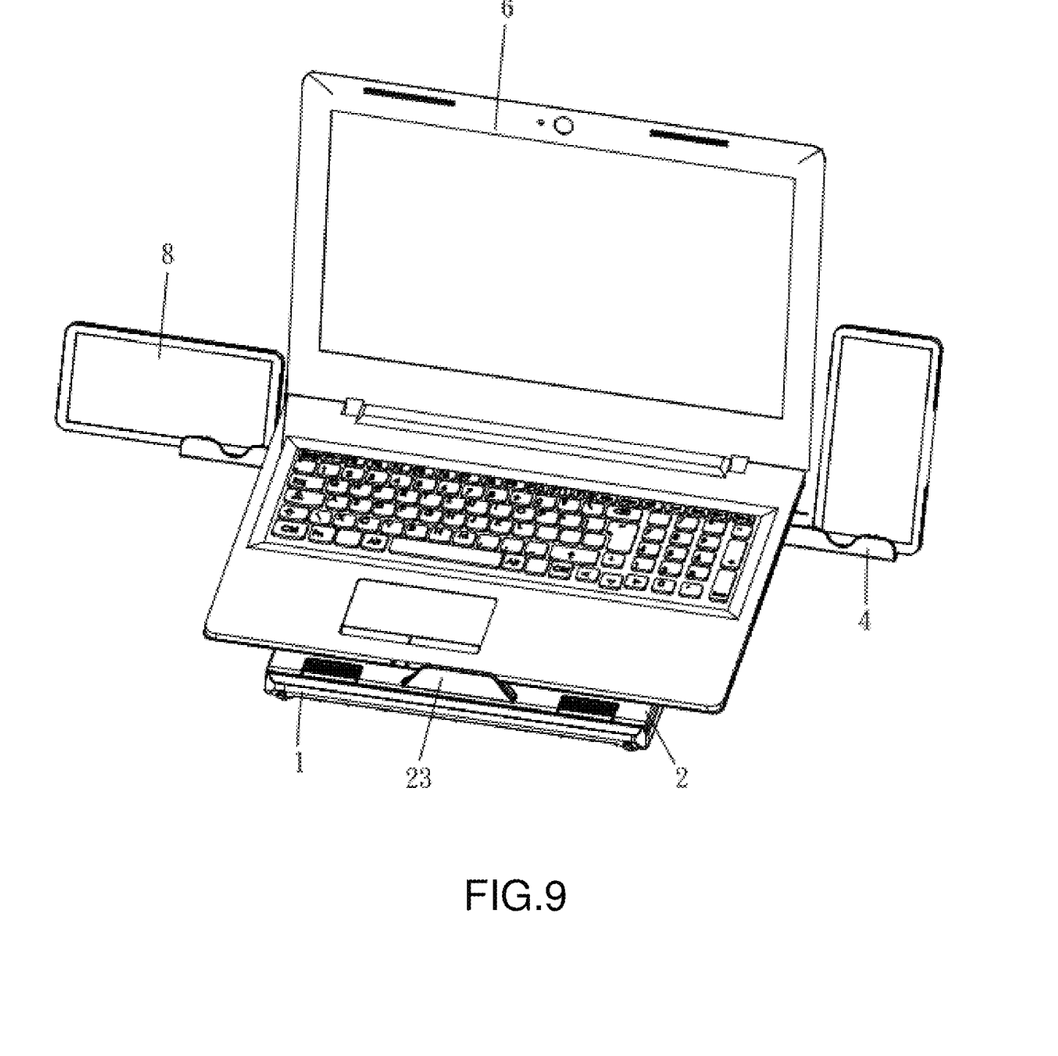
FIG. 9 is another perspective view of FIG. 8 with two mobile phones being supported by the extension arms.

Referring to FIG. 9, two mobile phones 8 are supported by partially disposing in the troughs 41 respectively.

Figure 10:
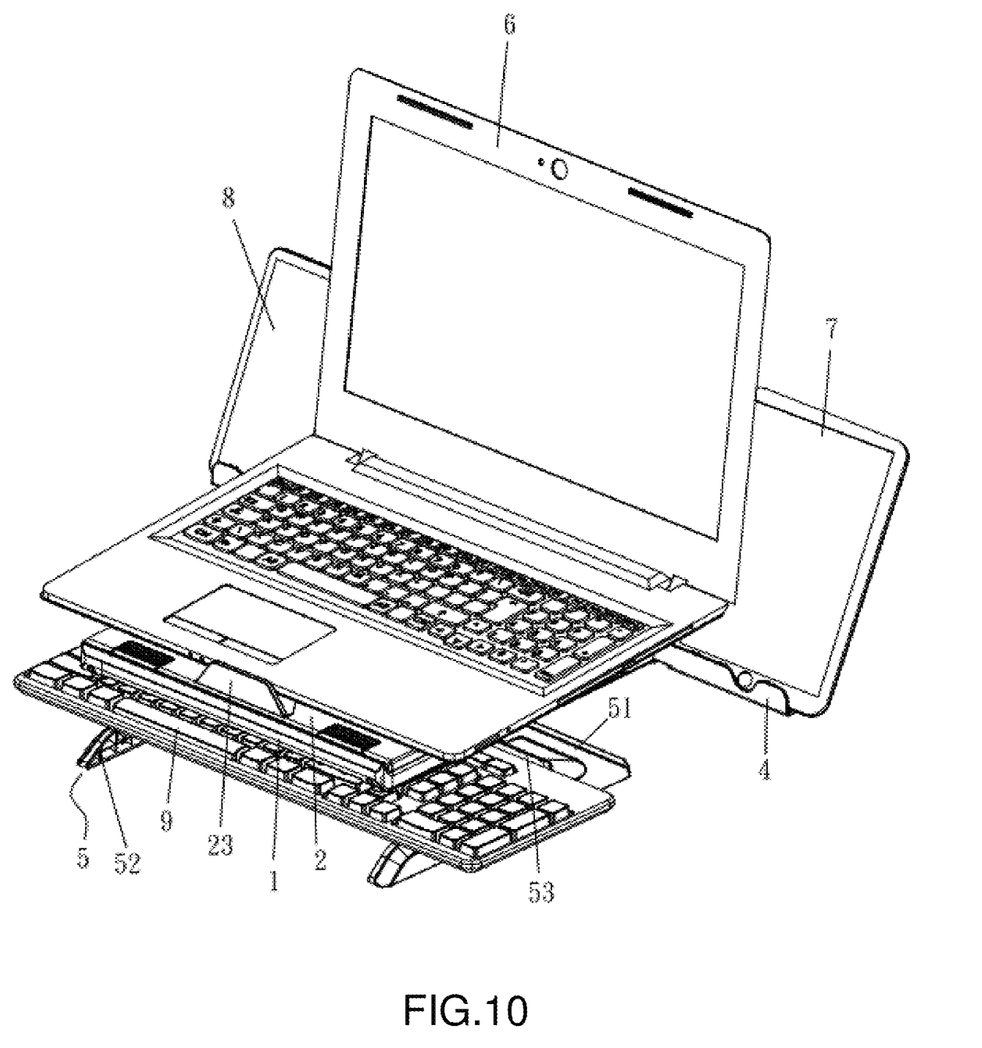
FIG. 10 is a view similar to FIG. 9 in which one mobile phone is replaced by a tablet computer and the legs are fully extended so that a keyboard can be disposed under the panel.

Referring to FIG. 10, one mobile phone 8 and a tablet computer 7 are supported by partially disposing in the troughs 41 respectively. Further, the notebook computer 6 open and placed on the inclined panel 2. Furthermore, the legs 5 are fully extended so that a keyboard 9 may be disposed in the recesses 53 under the base 1 and supported by the main parts 52.

While the invention has been described in terms of preferred embodiments, those skilled in the art will recognize that the invention can be practiced with modifications within the spirit and scope of the appended claims.

What is claimed is:

1. A folding stand comprising:
   a rectangular base including two parallel sets of a plurality of slots on a top surface of the base, two cavities on a bottom surface of the base, two pivots arranged at a respective rear corner of the base, and a side hole;
   an upper panel hinged to a front edge of the base and including two sets of two parallel grooves, two spacers, wherein each spacer is configured to be removably disposed in a ready-to-use position, where the spacer is disposed in a respective groove, or in a non-use position, where the spacer is disposed in the side hole, and a ledge pivoting at a front edge of the upper panel;
   a support arm having two ends pivotably secured to a bottom surface of the panel and configured to selectively dispose in the slots of different sets for adjusting an inclined angle of the panel with respect to the base;
   two extension arms each having one end pivotably secured to a respective pivot and each extension arm including a lengthwise trough; and
   two opposed legs each including a main part, a second part inclined at an acute angle with respect to the main part, a hinge tube at an end of the second part, and a pivot pin extending through the base and the hinge tube to pivotably connect the hinge tube in a respective cavity wherein, in a first position, the opposed legs are disposed in the cavities and wherein, in a second position, the legs extend from the cavities by pivoting.

* * * * *